United States Patent
Bregler et al.

(10) Patent No.: US 10,984,021 B2
(45) Date of Patent: Apr. 20, 2021

(54) DEPLOYMENT OF INDEPENDENT DATABASE ARTIFACT GROUPS

(71) Applicant: SAP SE, Walldorf (DE)

(72) Inventors: Jonathan Bregler, Kraichtal (DE); Alexander Bunte, Heidelberg (DE); Arne Harren, Walldorf (DE); Andreas Kellner, Birkenau-Löhrbach (DE); Daniel Kuntze, Bruchsal (DE); Simon Lueders, Walldorf (DE); Volker Sauermann, Dossenheim (DE); Michael Schnaubelt, Leimen (DE); Le-Huan Stefan Tran, Malsch (DE)

(73) Assignee: SAP SE, Walldorf (DE)

( * ) Notice: Subject to any disclaimer, the term of this patent is extended or adjusted under 35 U.S.C. 154(b) by 858 days.

(21) Appl. No.: 15/637,601

(22) Filed: Jun. 29, 2017

(65) Prior Publication Data
US 2019/0005108 A1    Jan. 3, 2019

(51) Int. Cl.
| G06F 16/00 | (2019.01) |
| G06F 16/28 | (2019.01) |
| G06F 9/38 | (2018.01) |
| G06F 9/445 | (2018.01) |
| G06F 16/21 | (2019.01) |
| G06F 16/23 | (2019.01) |
| G06F 8/60 | (2018.01) |

(52) U.S. Cl.
CPC .......... *G06F 16/285* (2019.01); *G06F 9/3838* (2013.01); *G06F 9/445* (2013.01); *G06F 16/214* (2019.01); *G06F 16/2386* (2019.01); *G06F 8/60* (2013.01); *G06F 9/44526* (2013.01)

(58) Field of Classification Search
CPC .............. G06F 16/288; G06F 16/2237; G06F 16/2246; G06F 16/2379; G06F 16/2386
See application file for complete search history.

(56) References Cited

U.S. PATENT DOCUMENTS

| 7,124,148 B2 | 10/2006 | Sauermann |
| 7,222,308 B2 | 5/2007 | Sauermann et al. |
| 7,231,387 B2 | 6/2007 | Sauermann et al. |
| 7,257,599 B2 | 8/2007 | Sauermann et al. |
| 7,310,719 B2 | 12/2007 | Von Bergen et al. |
| 7,337,295 B2 | 2/2008 | Von Bergen et al. |
| 7,373,340 B2 | 5/2008 | Sauermann et al. |
| 7,403,495 B2 | 7/2008 | Sauermann |
| 7,415,458 B2 | 8/2008 | Sauermann |
| 7,447,987 B2 | 11/2008 | Sauermann |
| 7,454,454 B2 | 11/2008 | Sauermann |
| 7,487,165 B2 | 2/2009 | Sauermann et al. |
| 7,574,676 B2 | 8/2009 | Sauermann |

(Continued)

OTHER PUBLICATIONS

Kheir, Nizar, et al. "Cost evaluation for intrusion response using dependency graphs." 2009 International Conference on Network and Service Security. IEEE, 2009.*

(Continued)

*Primary Examiner* — Nan Hutton
(74) *Attorney, Agent, or Firm* — Fish & Richardson P.C.

(57) ABSTRACT

A dependency graph is generated for database files. An unvisited node of the dependency graph is selected and a breadth-first-search performed starting from the selected unvisited node. Results of the breadth-first-search is defined as a group. A group assignment for the database files is returned.

18 Claims, 4 Drawing Sheets

(56) References Cited

U.S. PATENT DOCUMENTS

| | | | |
|---|---|---|---|
| 7,590,683 B2 | 9/2009 | Bergen et al. | |
| 7,610,582 B2 | 10/2009 | Becker et al. | |
| 7,647,592 B2 | 1/2010 | Sauermann | |
| 7,653,452 B2 | 1/2010 | Sauermann et al. | |
| 7,664,858 B2 | 2/2010 | Sauermann | |
| 7,665,030 B2 | 2/2010 | Sauermann et al. | |
| 7,685,510 B2 | 3/2010 | Sauermann | |
| 7,725,900 B2 | 5/2010 | Sauermann | |
| 7,730,053 B2 | 6/2010 | Sauermann | |
| 7,752,628 B2 | 7/2010 | Sauermann | |
| 7,797,286 B2 | 9/2010 | Sauermann | |
| 7,873,666 B2 | 1/2011 | Sauermann | |
| 7,900,155 B2 | 3/2011 | Sauermann | |
| 8,074,206 B2 | 12/2011 | Sauermann et al. | |
| 8,078,985 B2 | 12/2011 | Sauermann | |
| 8,108,798 B2 | 1/2012 | Sauermann | |
| 8,171,422 B2 | 5/2012 | Sauermann | |
| 8,203,972 B2 * | 6/2012 | Sauermann | H04L 41/12 370/256 |
| 8,224,938 B2 | 7/2012 | Sauermann | |
| 8,510,710 B2 | 8/2013 | Harren et al. | |
| 8,601,025 B1 * | 12/2013 | Shajenko | G06F 16/9024 707/778 |
| 8,621,385 B2 | 12/2013 | Sauermann et al. | |
| 9,026,525 B2 | 5/2015 | Harren et al. | |
| 9,026,857 B2 | 5/2015 | Becker et al. | |
| 9,047,105 B2 | 6/2015 | Kinder et al. | |
| 9,069,832 B2 | 6/2015 | Becker et al. | |
| 9,411,707 B1 * | 8/2016 | Hale | G06F 16/2237 |
| 9,600,269 B1 | 3/2017 | Bregler et al. | |
| 9,704,168 B2 | 7/2017 | Chauhan et al. | |
| 10,657,114 B2 | 5/2020 | Bregler et al. | |
| 10,674,438 B2 | 6/2020 | Bregler et al. | |
| 10,776,330 B2 | 9/2020 | Bregler et al. | |
| 2004/0122865 A1 | 6/2004 | Stahl et al. | |
| 2004/0220893 A1 | 11/2004 | Spivack et al. | |
| 2005/0044110 A1 | 2/2005 | Herzenberg et al. | |
| 2005/0055331 A1 | 3/2005 | Sauermann et al. | |
| 2006/0005017 A1 | 1/2006 | Black et al. | |
| 2006/0179058 A1 | 8/2006 | Bram et al. | |
| 2008/0040367 A1 * | 2/2008 | Bitonti | G06F 16/289 |
| 2008/0046462 A1 | 2/2008 | Kaufman et al. | |
| 2009/0043796 A1 * | 2/2009 | Sauermann | H04L 41/12 |
| 2009/0265314 A1 | 10/2009 | Kindsvogel et al. | |
| 2010/0082549 A1 | 4/2010 | Hollingsworth et al. | |
| 2011/0054266 A1 | 3/2011 | Dhino et al. | |
| 2013/0031165 A1 * | 1/2013 | Pantos | H04L 67/02 709/203 |
| 2014/0215385 A1 | 7/2014 | Sauermann | |
| 2015/0106736 A1 | 4/2015 | Torman et al. | |
| 2016/0072817 A1 | 3/2016 | Makhervaks et al. | |
| 2016/0085841 A1 | 3/2016 | Dorfman et al. | |
| 2016/0094681 A1 | 3/2016 | Wu | |
| 2016/0179850 A1 | 6/2016 | Martin et al. | |
| 2016/0182315 A1 | 6/2016 | Salokanto et al. | |
| 2016/0182327 A1 | 6/2016 | Coleman et al. | |
| 2016/0294881 A1 | 10/2016 | Hua et al. | |
| 2016/0378518 A1 | 12/2016 | Antony et al. | |
| 2017/0147333 A1 * | 5/2017 | Bregler | G06F 8/60 |
| 2017/0177892 A1 | 6/2017 | Tingstrom et al. | |
| 2017/0286526 A1 * | 10/2017 | Bar-Or | G06F 8/60 |
| 2017/0315882 A1 * | 11/2017 | Yammine | G06F 9/466 |
| 2017/0322991 A1 | 11/2017 | Tran et al. | |
| 2017/0323112 A1 | 11/2017 | Tran et al. | |
| 2018/0062956 A1 | 3/2018 | Schultz et al. | |
| 2018/0095739 A1 * | 4/2018 | Baset | G06F 8/71 |
| 2018/0097725 A1 * | 4/2018 | Wood | H04L 45/50 |
| 2019/0005074 A1 | 1/2019 | Bregler et al. | |
| 2019/0007895 A1 | 1/2019 | Bregler et al. | |
| 2019/0163772 A1 | 5/2019 | Bregler et al. | |
| 2019/0005054 A1 | 10/2019 | Bregler et al. | |

OTHER PUBLICATIONS

Mavlyutov, Ruslan, et al. "Dependency-Driven Analytics: A Compass for Uncharted Data Oceans." CIDR. 2017.*
Non-final office action issued in U.S. Appl. No. 15/637,698 dated Aug. 26, 2019, 14 pages.
Non-Final Office Action issued in U.S. Appl. No. 15/637,554 dated Jun. 7, 2019, 15 pages.
Final office action issued in U.S. Appl. No. 15/637,531 dated Nov. 29, 2019, 19 pages.
Non-final office action issued in U.S. Appl. No. 15/637,554 dated Jan. 24, 2020, 16 pages.
Final office action issued in U.S. Appl. No. 15/637,554 dated Oct. 21, 2019, 16 pages.
U.S. Appl. No. 15/824,041, filed Nov. 28, 2017, Bregler et al.
Non-Final Office Action issued in U.S. Appl. No. 15/637,698 dated Mar. 7, 2019, 12 pages.
Non-Final Office Action issued in U.S. Appl. No. 15/637,531 dated May 9, 2019, 42 pages.
Non-Final Office Action issued in U.S. Appl. No. 15/637,531 dated Jun. 2, 2020, 26 pages.
Non-Final Office Action issued in U.S. Appl. No. 15/637,531 dated Sep. 21, 2020, 21 pages.

* cited by examiner

US 10,984,021 B2

DEPLOYMENT OF INDEPENDENT DATABASE ARTIFACT GROUPS

CROSS REFERENCE TO RELATED APPLICATIONS

This application is related to and filed in conjunction with U.S. patent application Ser. No. 15/637,554, filed on Jun. 29, 2017, entitled "OPTIMIZED REDEPLOYMENT OF DATABASE ARTIFACTS"; which is also related to and filed in conjunction with U.S. patent application Ser. No. 15/637,531, filed on Jun. 29, 2017, entitled "DATABASE-LEVEL CONTAINER GROUP MANAGEMENT"; which is also related to and filed in conjunction with U.S. patent application Ser. No. 15/637,698, filed on Jun. 29, 2017, entitled "RESTRICTING ACCESS TO EXTERNAL SCHEMAS FROM WITHIN A DATABASE LEVEL CONTAINER BY WHITELISTING ALLOWED SCHEMAS", the entire contents of each application and together are hereby incorporated by reference.

BACKGROUND

SAP HANA is an in-memory, column-oriented, relational database management system. The HANA platform is fundamentally based on the principle of pushing down data-intensive computations into a HANA database layer in order to benefit from HANA's in-memory capabilities and to avoid unnecessary data transfers between the database layer and an application layer. Computations can be pushed down using, for example, SQL SCRIPT procedures, different types of database views, application functions, etc.

HANA Deployment Infrastructure (HANA DI) is a service layer of the HANA database that simplifies the deployment of HANA database objects by providing a declarative approach for defining database objects (as design-time artifacts) and ensuring a consistent deployment into the database, based on a transactional all-or-nothing deployment model and implicit dependency management. HANA DI is focused only on deployment aspects and addresses both development and modeling scenarios as part of the HANA database.

Sometimes multiple HANA DI-based applications, each application including multiple files are transported at the same time between development systems (for example, between a source and target system). Because of varying development status, some of the applications may not be compatible with the target system, causing deployment failure for all applications, when it is possible to deploy at least the compatible applications. Likewise, HANA DI-based deployments for single applications sometimes fail due to one or more file errors, when it is possible to deploy a subset of interdependent files without errors.

SUMMARY

The present disclosure describes deployment of independent database artifact groups.

In an implementation, a dependency graph is generated for database files. An unvisited node of the dependency graph is selected and a breadth-first-search performed starting from the selected unvisited node. Results of the breadth-first-search is defined as a group. A group assignment for the database files is returned.

The previously described implementation is implementable using a computer-implemented method; a non-transitory, computer-readable medium storing computer-readable instructions to perform the computer-implemented method; and a computer-implemented system comprising a computer memory interoperably coupled with a hardware processor configured to perform the computer-implemented method/the instructions stored on the non-transitory, computer-readable medium.

The subject matter described in this specification can be implemented in particular implementations, so as to realize one or more of the following advantages. A large set of design-time files can be transported, where "broken" files do not break the deployment of unrelated files. The design-time files can be applicable to either single or multiple applications. The described methodology permits the deployment of as many files as possible to minimize deployment disruptions. Groups of files which have no dependency to a group of one or more non-deployable files can be determined and deployed independently. Other advantages will be apparent to those of ordinary skill in the art.

The details of one or more implementations of the subject matter of this specification are set forth in the accompanying drawings and the description. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

Figure 1:
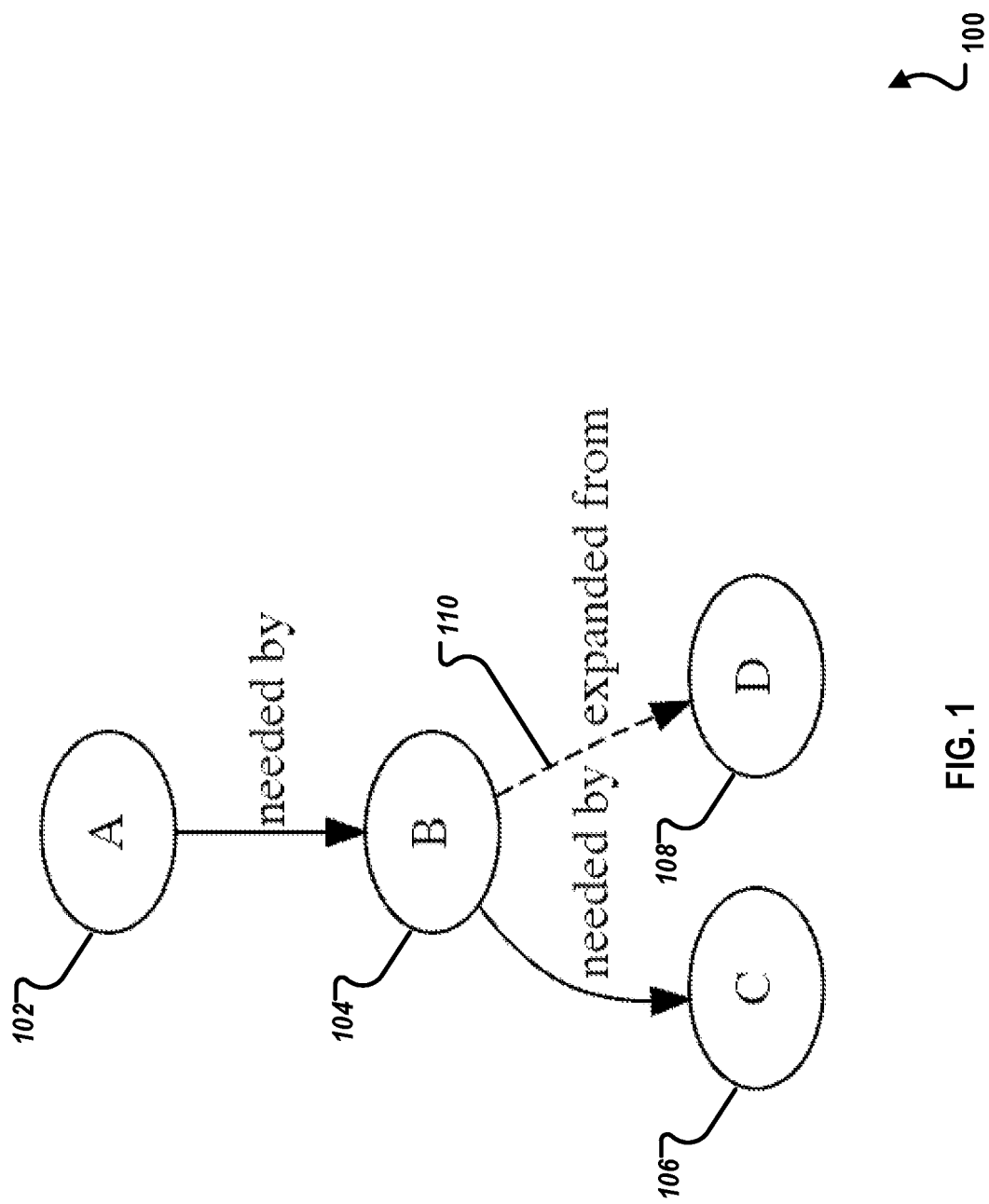
FIG. 1 is a block diagram of an example dependency graph of a first group, according to an implementation.

The following detailed description describes deployment of independent database artifact groups, and is presented to enable any person skilled in the art to make and use the disclosed subject matter in the context of one or more particular implementations. Various modifications, alterations, and permutations of the disclosed implementations can be made and will be readily apparent to those or ordinary skill in the art, and the general principles defined may be applied to other implementations and applications, without departing from scope of the disclosure. In some instances, details unnecessary to obtain an understanding of the described subject matter may be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

For purposes of understanding, this disclosure is focused on discussion of the described methodology and subject matter with respect to the HANA platform. However, the described methodology and subject matter is also applicable to conventional- and hybrid-type database platforms, and discussion related to the HANA platform is not meant to limit the disclosure or scope of the described subject matter in any way, or to limit applicability to other database platforms.

SAP HANA is an in-memory, column-oriented, relational database management system. The HANA platform is fundamentally based on the principle of pushing down data-intensive computations into a HANA database layer in order to benefit from HANA's in-memory capabilities and to avoid unnecessary data transfers between the database layer and an application layer. Computations can be pushed down using, for example, SQL SCRIPT procedures, different types of database views, application functions, etc.

HANA Deployment Infrastructure (HANA DI) is a service layer on top of the HANA database that simplifies the deployment of HANA database objects by providing a declarative approach for defining a database object (as a design-time database artifact (or "artifact")) and ensuring a consistent deployment into the database, based on a transactional all-or-nothing deployment model and implicit dependency management. In typical implementations, for creating, modifying, and deleting objects inside the database, HANA DI uses SQL commands. HANA DI is configured to run inside its own process as part of a HANA database cluster (for example, one process per logical database).

HANA DI is focused only on deployment/re-deployment aspects and addresses both development and modeling scenarios as part of the HANA database. In typical implementations, non-deployment aspects (for example, version control and lifecycle management) are not handled by HANA DI, but in both the cloud and on premise as part of overall development and deployment architecture and infrastructure. As will be appreciated by those of ordinary skill in the art, in some implementations, the HANA DI can be configured to implement, manage, trigger, or execute some or all non-deployment aspects.

In typical implementations, HANA DI provides artifacts for HANA database objects (for example, tables, views, calculation views, procedures, and core data services (CDS)). Non-database artifacts (for example, JAVASCRIPT programs and Open Data Protocol (ODATA)) are handled by application containers. Deployment of database objects using HANA DI is based on a container model where each container corresponds to a database schema.

Development of a HANA database persistence or compute logic is not only about sending SQL CREATE statements to the database, it's more about writing or modeling a networked set of persistence objects (for example, tables, sequences, views, procedures, functions, and data flows). Putting these objects into file-based artifacts simplifies a dependency-based deployment, un-deployment, and re-deployment, and facilitates lifecycle management aspects (for example, transports). Additionally, not all artifacts must have a 1:1 relationship to a SQL statement (for example, graphical calculation views split up into multiple database objects and table data might be provided using CSV text files or even binary files which do not correspond to SQL).

File-based artifacts also allow separating the two steps of: 1) uploading the artifacts into the HANA DI (staging) and 2) deploying the artifacts. File-based artifacts also simplify incremental deployment scenarios where only modified files are uploaded. The file-based artifacts represent the target state of the database objects (for example, they specify a view definition in a declarative way instead of imperative CREATE, ALTER, and DROP statements).

Upon the deployment of a HANA DI artifact, HANA DI will automatically calculate all dependent and already deployed database objects in order to re-deploy them to achieve a consistent target state. The HANA DI extracts the set of provided and required database (runtime) objects from the file-based artifacts and uses this information for dependency management during deployment (for example, to calculate an order in which the database objects need to be created, and to detect missing, required objects). Additionally, dependencies are used to re-deploy database objects that are affected by newly deployed objects.

The HANA DI is configured to use database mechanisms to ensure a transactional all-or-nothing deployment. This means that all modifications of database objects (including Data Definition Language (DDL) and Data Manipulation Language (DML) operations and all re-deployments of affected artifacts) are performed inside a single database transaction. Explicit compensation actions in case of rollbacks are not required and are handled by the HANA database as part of the transaction management.

In typical implementations, a single deployment only operates on a single container. Here, the container boundary acts as a deployment boundary (for example, affected database objects inside other database schemata are not re-deployed and deployment does not fail if database objects inside other schemata break). In addition to schema-based containers, the HANA DI also uses database schemata to isolate its metadata (for example, to separate storage of file-based artifacts from deployed database objects).

The HANA DI provides infrastructure for all deployment aspects. The interpretation of artifacts, including the extraction of dependencies and the steps to implement a target-state-based deployment of the artifacts, is performed by HANA DI build plugins (for example, a plugin for a table artifact type and a plugin for a view artifact type). Build Plugins have access to a deployment container using a SQL-based API. In this way, all commands that the build plugins need (for example, creating, altering, or dropping a database object) are configured take database security constraints into account and to be available at the SQL layer of HANA. At a lower-level and in typical implementations, to be exposed to the design-time world using the HANA DI, SQL commands must be configured to support transactional deployment where DDL and DML statements are run inside a single database transaction in non-auto-commit mode.

Deployment-related activities (for example, staging of files and triggering a deployment into a single container) are typically performed by a dedicated technical deployment user. Therefore, a fine-grained security control on the level of files or the HANA DI build plugins is not required, because the technical deployment user needs full control in the container. Typically, the schema owner of the container schema should be different from the technical deployment user to allow the separation of privileges for deployment and runtime access to the deployed database objects. In the case of a development or modeling scenario, fine-grained security control is performed by the development infrastructure.

The deployment order of artifacts is driven by the information about the database runtime objects which are provided by an artifact and which are required by an artifact. Based on this information, a dependency graph is created that connects the object providers to the corresponding object consumers.

Sometimes multiple HANA DI-based applications, each application including multiple files are transported at the same time between development systems (for example, between a source and target system). Because of varying development status, some of the applications may not be compatible with the target system, causing deployment failure for all applications, when it is possible to deploy at least the compatible applications. Even though transport personnel may not have knowledge of which files belong to each application, at least the compatible applications should be deployed in order to minimize application deployment disruption.

Likewise, HANA DI-based deployments for single applications sometimes fail due to one or more file errors. Normally, a developer must repair every error in order to be able to successfully deploy the files. While it is possible to deploy a subset of interdependent files without errors, this operation requires a detailed knowledge of dependencies between the files, which is not always available. In more complex scenarios (for example, with hundreds or thousands of files), generating or maintaining this information is not always feasible.

Described is an application programming interface (API) which simulates a deployment through the previously described deployment graph generation, but does not try to actually deploy the files using the generated deployment graph. A graph node corresponds to an action (for example, deploy, undeploy, and redeploy) that needs to be performed for a specific file in the actual deployment process. For example, it can be said that files are extracted from a node. A search (for example, a breadth-first-search (BFS)) is started for an arbitrary node in the graph to transitively find all predecessor and successor nodes as well as related nodes (for example, expansions, expansion parents, merges, and mergees). The set of found nodes is one group. This search is repeated for unvisited nodes until each node is assigned to exactly one group. The resulting determined groups have no dependencies to other groups and can each be deployed independently without affecting other groups. Groups for which the deployment still fails can be specifically reported to the developers.

Files are filtered for those the deployment was called for and returned together with their group assignment. As an example, in FIG. 1 (described below), C 106 might represent an existing (already deployed) file, which was not changed, but needs to be implicitly redeployed because of its dependency to A 102. The deployment of A 102 was explicitly requested, so it is returned as part of a group. C 106 was implicitly added to the graph, so it is not returned to the caller. Similarly B 104 represents an implicitly generated file. So from a user's perspective it doesn't really exist and, thus, is not returned. Instead, D 108, the file it was generated from, is returned. For this operation, revalidations and files generated by HANA DI are ignored.

FIG. 1 is a block diagram of an example dependency graph 100 of a first group, according to an implementation. Graph 100 includes nodes A 102, B 104, C 106, and D 108. Dashed lines (for example line 110) indicate "expanded from" dependencies which have no effect on an actual deploy order, but are important for determining a correct group. For example, in FIG. 1, node B 104 is indicated as "generated from" node D 108 and cannot be directly passed to a make. This is because the HANA DI has two types of "virtual" files which are automatically generated from "real" files in the deployment process: 1) expansions and 2) merges. For example, a database synonym definition file can define multiple database synonyms. The HANA DI can automatically expand the synonym definitions into files containing exactly one synonym definition each. A merge is the opposite—multiple files providing the same artifact are merged into one "virtual" file. As a result, node D 108 must be in the same group as node A 102 and C 106, such that node B 104 is implicitly in the group.

An additional scenario (not illustrated) involves renaming/moving a file. This operation results in removal/undeployment of an old file and a creation/deployment of a new file. In other words the old file is replaced by the new file. This causes an additional dependency between the files, and both files are considered to be within the same group.

Figure 2:
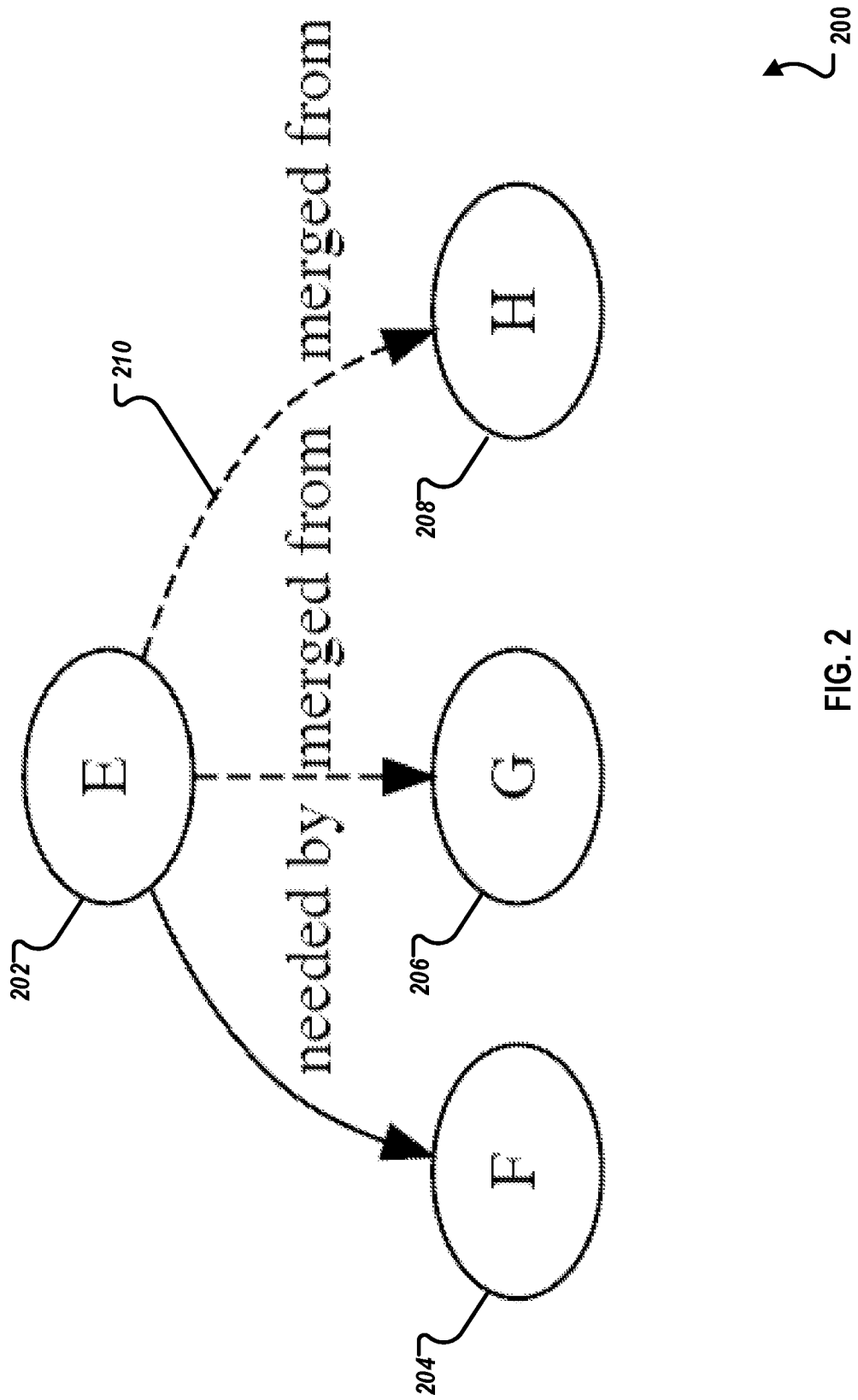
FIG. 2 is a block diagram of an example dependency graph of a second group, according to an implementation.

Similarly, FIG. 2 is a block diagram of an example dependency graph 200 of a second group, according to an implementation. Graph 200 includes nodes E 202, F 204, G 206, and H 208. Dashed lines (for example, line 210) indicate "merged from" dependencies. With respect to the explanation of merging above in FIG. 1, G 206 and H 208 are merged into E 202. Note that "generated from" can be used as a generalization of the dashed lines in FIGS. 1 and 2 for "expanded from" (as previously explained) and "merged from," both of which do not affect deployment order. However "needed by" does affect deployment order.

Figure 3:
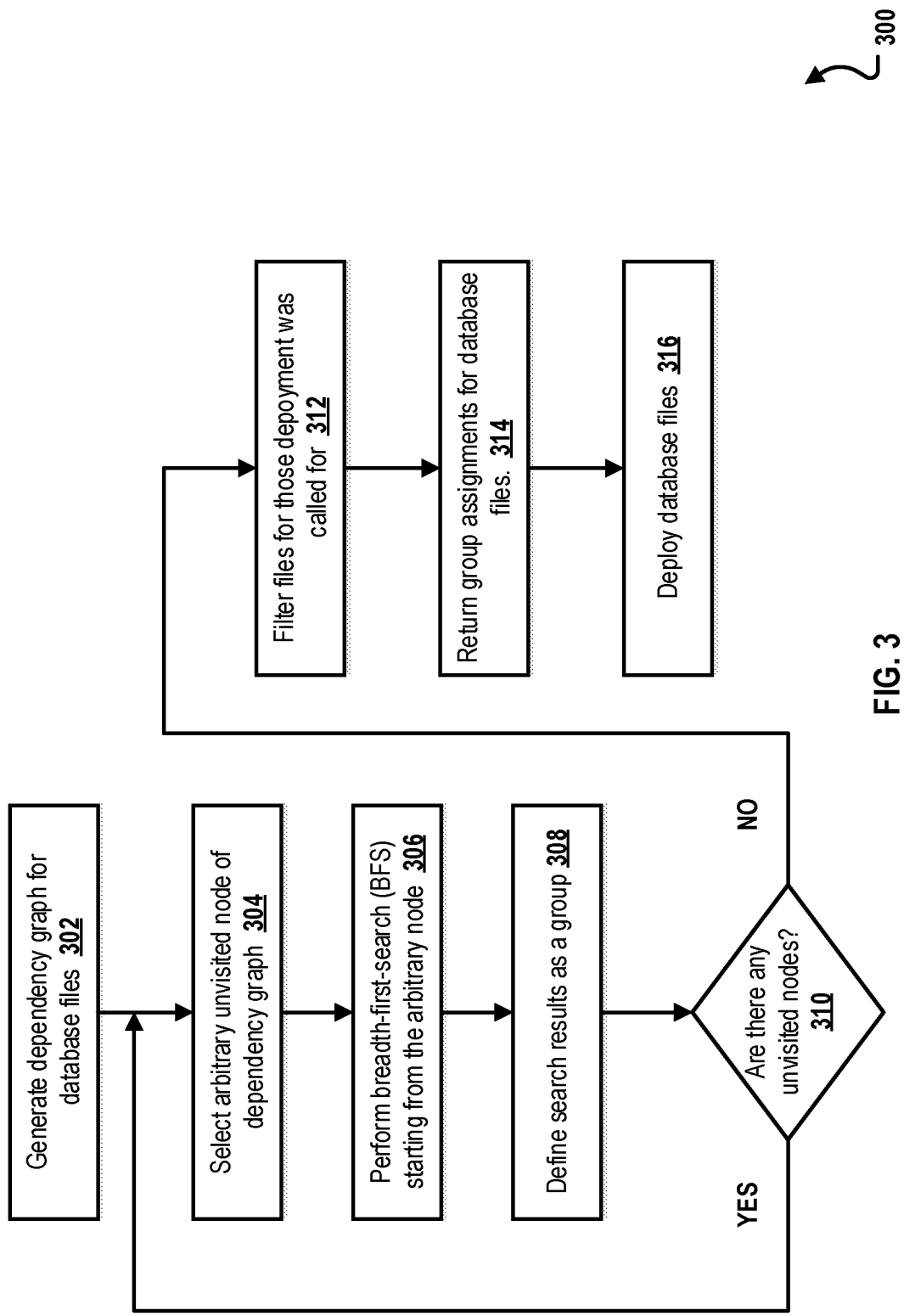
FIG. 3 is a flowchart of an example method for deployment of independent database artifact groups, according to an implementation.

FIG. 3 is a flowchart of an example method 300 for deployment of independent database artifact groups, according to an implementation. For clarity of presentation, the description that follows generally describes method 300 in the context of the other figures in this description. However, it will be understood that method 300 may be performed, for example, by any suitable system, environment, software, and hardware, or a combination of systems, environments, software, and hardware, as appropriate. In some implementations, various steps of method 300 can be run in parallel, in combination, in loops, or in any order.

At 302, a dependency graph is generated for database files. From 302, method 300 proceeds to 304.

At 304, an arbitrary unvisited node of the dependency graph is selected. In typical implementations, each node has a unique ID assigned from a range of [0, n−1], where 'n' is the node count in the dependency graph. A "Visited" Boolean array of size 'n' keeps track of visited nodes. Once a node has been chosen as start point or detected as reachable from a starting node, the corresponding entry in the Boolean array is, if not already set, set as visited (for example, 1 indicates visited and 0 indicates unvisited), otherwise the node is considered already visited and ignored. From 304, method 300 proceeds to 306.

At 306, a breadth-first-search (BFS) is performed from the arbitrary node. In typical implementations, BFS traversal happens in both incoming and outgoing directions of graph edges. BFS search is based on a worklist of found, but not yet further traversed nodes in the currently determined group and the mentioned Visited Boolean array. From 306, method 300 proceeds to 308.

At 308, the BFS results are defined as a group. A group is internally a set of file uniform resource identifiers (URIs) (for example, represented as strings). The sets are stored in a list. The index of a group in the list is a group ID. Since different groups by definition cannot overlap, an already fully determined group is no longer considered. From 308, method 300 proceeds to 310.

At 310, a determination is made as to whether there are any unvisited nodes in the dependency graph. If it is determined that there are unvisited nodes in the dependency graph, method 300 proceeds back to 304. Otherwise, if it is determined that there are no unvisited nodes in the dependency graph, method 3 proceeds to 312.

At 312, files are filtered for those the deployment was called for. There is no actual deployment performed directly. Errors may happen while creating a dependency graph (for example, syntax errors in files and missing files), but without a complete and correct dependency graph, we cannot determine groups at all. The BFS, which computes the groups, does not perform any error checking.

The deployment of groups is triggered externally as an additional step. The typical idea is to run a deployment per group. From 312, method 300 proceeds to 314.

At 314, a group assignment for the database files is returned. From 314, method 300 proceeds to 316.

At 316, a deployment of files is initiated. Note that the deployment is not part of a group determination. Deployment is initiated "independently" based on returned group information. After 316, method 300 stops.

Figure 4:
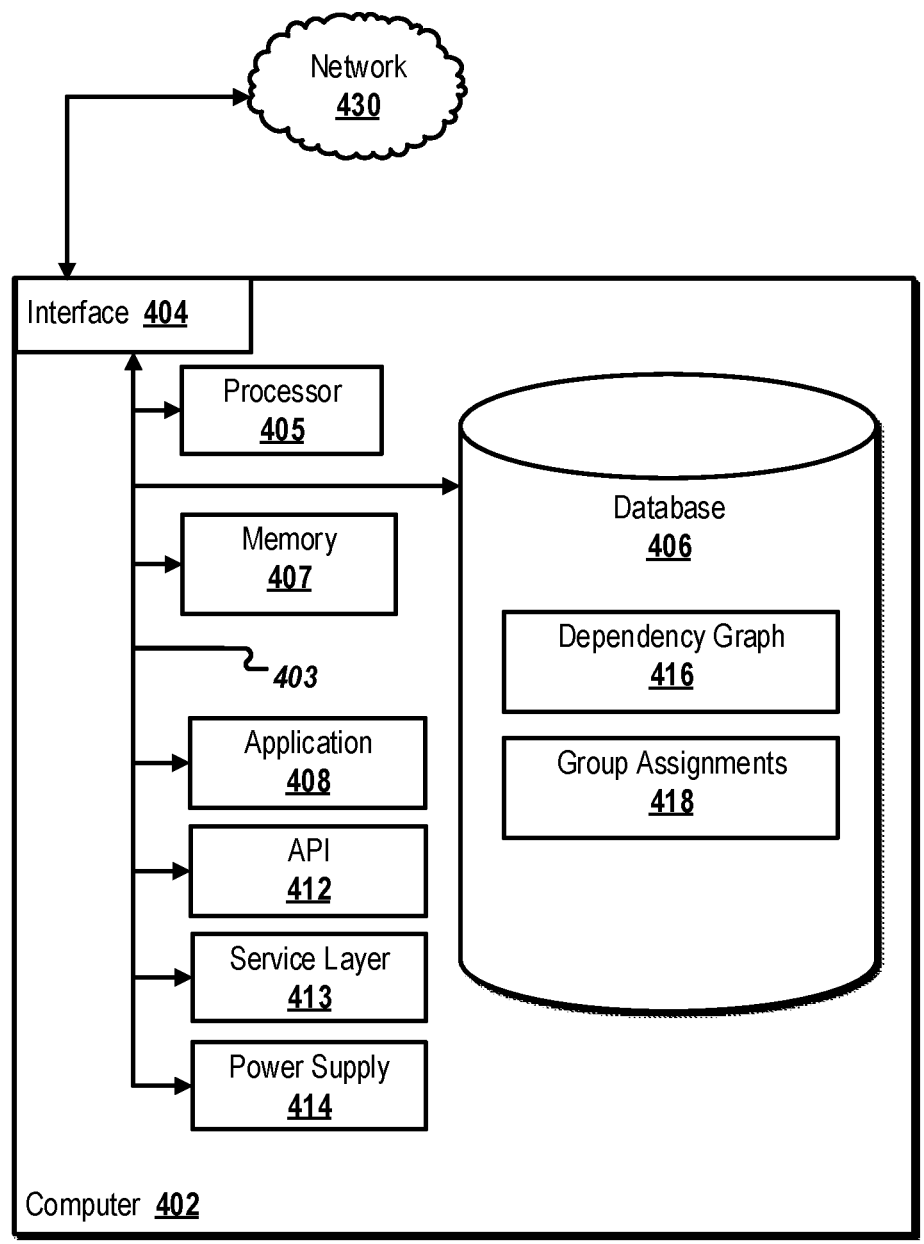
FIG. 4 is a block diagram illustrating an example computer system used to provide computational functionalities associated with described algorithms, methods, functions, processes, flows, and procedures as described in the instant disclosure, according to an implementation.

FIG. 4 is a block diagram of an example computer system 400 used to provide computational functionalities associated with described algorithms, methods, functions, processes, flows, and procedures, as described in the instant disclosure, according to an implementation. The illustrated computer 402 is intended to encompass any computing device such as a server, desktop computer, laptop/notebook computer, wireless data port, smart phone, personal data assistant (PDA), tablet computing device, one or more processors within these devices, or any other suitable processing device, including physical or virtual instances (or both) of the computing device. Additionally, the computer 402 may comprise a computer that includes an input device, such as a keypad, keyboard, touch screen, or other device that can accept user information, and an output device that conveys information associated with the operation of the computer 402, including digital data, visual, or audio information (or a combination of information), or a graphical user interface (GUI).

The computer 402 can serve in a role as a client, network component, a server, a database or other persistency, or any other component (or a combination of roles) of a computer system for performing the subject matter described in the instant disclosure. The illustrated computer 402 is communicably coupled with a network 430. In some implementations, one or more components of the computer 402 may be configured to operate within environments, including cloud-computing-based, local, global, or other environment (or a combination of environments).

At a high level, the computer 402 is an electronic computing device operable to receive, transmit, process, store, or manage data and information associated with the described subject matter. According to some implementations, the computer 402 may also include or be communicably coupled with an application server, e-mail server, web server, caching server, streaming data server, or other server (or a combination of servers).

The computer 402 can receive requests over network 430 from a client application (for example, executing on another computer 402) and respond to the received requests by processing the received requests using an appropriate software application(s). In addition, requests may also be sent to the computer 402 from internal users (for example, from a command console or by other appropriate access method), external or third-parties, other automated applications, as well as any other appropriate entities, individuals, systems, or computers.

Each of the components of the computer 402 can communicate using a system bus 403. In some implementations, any or all of the components of the computer 402, hardware or software (or a combination of both hardware and software), may interface with each other or the interface 404 (or a combination of both), over the system bus 403 using an application programming interface (API) 412 or a service layer 413 (or a combination of the API 412 and service layer 413). The API 412 may include specifications for routines, data structures, and object classes. The API 412 may be either computer-language independent or dependent and refer to a complete interface, a single function, or even a set of APIs. The service layer 413 provides software services to the computer 402 or other components (whether or not illustrated) that are communicably coupled to the computer 402. The functionality of the computer 402 may be accessible for all service consumers using this service layer. Software services, such as those provided by the service layer 413, provide reusable, defined functionalities through a defined interface. For example, the interface may be software written in JAVA, C++, or other suitable language providing data in extensible markup language (XML) format or other suitable format. While illustrated as an integrated component of the computer 402, alternative implementations may illustrate the API 412 or the service layer 413 as stand-alone components in relation to other components of the computer 402 or other components (whether or not illustrated) that are communicably coupled to the computer 402. Moreover, any or all parts of the API 412 or the service layer 413 may be implemented as child or sub-modules of another software module, enterprise application, or hardware module without departing from the scope of this disclosure.

The computer 402 includes an interface 404. Although illustrated as a single interface 404 in FIG. 4, two or more interfaces 404 may be used according to particular needs, desires, or particular implementations of the computer 402. The interface 404 is used by the computer 402 for communicating with other systems that are connected to the network 430 (whether illustrated or not) in a distributed environment. Generally, the interface 404 comprises logic encoded in software or hardware (or a combination of software and hardware) and is operable to communicate with the network 430. More specifically, the interface 404 may comprise software supporting one or more communication protocols associated with communications such that the network 430 or interface's hardware is operable to communicate physical signals within and outside of the illustrated computer 402.

The computer 402 includes a processor 405. Although illustrated as a single processor 405 in FIG. 4, two or more processors may be used according to particular needs, desires, or particular implementations of the computer 402. Generally, the processor 405 executes instructions and manipulates data to perform the operations of the computer 402 and any algorithms, methods, functions, processes, flows, and procedures as described in the instant disclosure.

The computer 402 also includes a database 406 that can hold data for the computer 402 or other components (or a combination of both) that can be connected to the network 430 (whether illustrated or not). For example, database 406 can be an in-memory, conventional, or other type of database storing data consistent with this disclosure. In some implementations, database 406 can be a combination of two or more different database types (for example, a hybrid in-memory and conventional database) according to particular needs, desires, or particular implementations of the computer 402 and the described functionality. Although illustrated as a single database 406 in FIG. 4, two or more databases (of the same or combination of types) can be used according to particular needs, desires, or particular implementations of the computer 402 and the described functionality. While database 406 is illustrated as an integral component of the computer 402, in alternative implementations, database 406 can be external to the computer 402. As illustrated, the database 406 holds previously described dependency graph 416 and Group Assignments 418.

The computer 402 also includes a memory 407 that can hold data for the computer 402 or other components (or a combination of both) that can be connected to the network 430 (whether illustrated or not). For example, memory 407 can be random access memory (RAM), read-only memory (ROM), optical, magnetic, and the like, storing data consistent with this disclosure. In some implementations, memory 407 can be a combination of two or more different types of memory (for example, a combination of RAM and magnetic storage) according to particular needs, desires, or particular implementations of the computer 402 and the described functionality. Although illustrated as a single memory 407 in FIG. 4, two or more memories 407 (of the same or combination of types) can be used according to particular needs, desires, or particular implementations of the computer 402 and the described functionality. While memory 407 is illustrated as an integral component of the computer 402, in alternative implementations, memory 407 can be external to the computer 402.

The application 408 is an algorithmic software engine providing functionality according to particular needs, desires, or particular implementations of the computer 402, particularly with respect to functionality described in this disclosure. For example, application 408 can serve as one or more components, modules, or applications. Further, although illustrated as a single application 408, the application 408 may be implemented as multiple applications 408 on the computer 402. In addition, although illustrated as integral to the computer 402, in alternative implementations, the application 408 can be external to the computer 402.

The computer 402 can also include a power supply 414. The power supply 414 can include a rechargeable or non-rechargeable battery that can be configured to be either user- or non-user-replaceable. In some implementations, the power supply 414 can include power-conversion or management circuits (including recharging, standby, or other power management functionality). In some implementations, the power-supply 414 can include a power plug to allow the computer 402 to be plugged into a wall socket or other power source to, for example, power the computer 402 or recharge a rechargeable battery.

There may be any number of computers 402 associated with, or external to, a computer system containing computer 402, each computer 402 communicating over network 430. Further, the term "client," "user," and other appropriate terminology may be used interchangeably, as appropriate, without departing from the scope of this disclosure. Moreover, this disclosure contemplates that many users may use one computer 402, or that one user may use multiple computers 402.

Described implementations of the subject matter can include one or more features, alone or in combination.

For example, in a first implementation, a computer-implemented method, comprising: generating a dependency graph for database files; selecting an unvisited node of the dependency graph; performing a breadth-first-search (BFS) starting from the selected unvisited node; defining results of the BFS as a group; and returning a group assignment for the database files.

The foregoing and other described implementations can each, optionally, include one or more of the following features:

A first feature, combinable with any of the following features, wherein the selected unvisited node is selected arbitrarily and the BFS traverses nodes of the dependency graph in both incoming and outgoing directions of the dependency graph edges.

A second feature, combinable with any of the previous or following features, wherein each node of the dependency graph is assigned a unique ID from 0 to n−1, where n is the node count in the dependency graph.

A third feature, combinable with any of the previous or following features, further comprising marking entries in a Boolean array to indicate visited nodes in the dependency graph.

A fourth feature, combinable with any of the previous or following features, wherein a group is a set of file uniform resource identifiers.

A fifth feature, combinable with any of the previous or following features, further comprising: selecting another unvisited node of the dependency graph if unvisited nodes exist in the dependency graph; and filtering files for deployment if no unvisited nodes exist in the dependency graph.

A sixth feature, combinable with any of the previous or following features, further comprising initiating deployment of database files based upon group information.

In a second implementation, a non-transitory, computer-readable medium storing one or more instructions executable by a computer system to perform operations comprising: generating a dependency graph for database files; selecting an unvisited node of the dependency graph; performing a breadth-first-search (BFS) starting from the selected unvisited node; defining results of the BFS as a group; and returning a group assignment for the database files.

The foregoing and other described implementations can each, optionally, include one or more of the following features:

A first feature, combinable with any of the following features, wherein the selected unvisited node is selected arbitrarily and the BFS traverses nodes of the dependency graph in both incoming and outgoing directions of the dependency graph edges.

A second feature, combinable with any of the previous or following features, wherein each node of the dependency graph is assigned a unique ID from 0 to n−1, where n is the node count in the dependency graph.

A third feature, combinable with any of the previous or following features, further comprising one or more instructions to mark entries in a Boolean array to indicate visited nodes in the dependency graph.

A fourth feature, combinable with any of the previous or following features, wherein a group is a set of file uniform resource identifiers.

A fifth feature, combinable with any of the previous or following features, further comprising one or more instructions to: select another unvisited node of the dependency graph if unvisited nodes exist in the dependency graph; and filter files for deployment if no unvisited nodes exist in the dependency graph.

A sixth feature, combinable with any of the previous or following features, further comprising one or more instructions to initiate deployment of database files based upon group information.

In a third implementation, a computer-implemented system, comprising: a computer memory; and a hardware processor interoperably coupled with the computer memory and configured to perform operations comprising: generating a dependency graph for database files; selecting an unvisited node of the dependency graph; performing a breadth-first-search (BFS) starting from the selected unvisited node; defining results of the BFS as a group; and returning a group assignment for the database files.

The foregoing and other described implementations can each, optionally, include one or more of the following features:

A first feature, combinable with any of the following features, wherein the selected unvisited node is selected arbitrarily and the BFS traverses nodes of the dependency graph in both incoming and outgoing directions of the dependency graph edges.

A second feature, combinable with any of the previous or following features, wherein each node of the dependency graph is assigned a unique ID from 0 to n−1, where n is the node count in the dependency graph.

A third feature, combinable with any of the previous or following features, further configured to mark entries in a Boolean array to indicate visited nodes in the dependency graph.

A fourth feature, combinable with any of the previous or following features, wherein a group is a set of file uniform resource identifiers.

A fifth feature, combinable with any of the previous or following features, further configured to: select another unvisited node of the dependency graph if unvisited nodes exist in the dependency graph; and filter files for deployment if no unvisited nodes exist in the dependency graph.

A sixth feature, combinable with any of the previous or following features, further configured to initiate deployment of database files based upon group information.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data may be less than 1 ms, less than 1 sec., or less than 5 secs. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS, or any other suitable conventional operating system.

A computer program, which may also be referred to or described as a program, software, a software application, a module, a software module, a script, or code can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components, as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM), or both. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data includes all forms of non-volatile memory, media and memory devices, including by way of example semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and CD-ROM, DVD+/-R, DVD-RAM, and DVD-ROM disks. The memory may store various objects or data, including caches, classes, frameworks, applications, backup data, jobs, web pages, web page templates, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons. These and other UI elements may be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with this disclosure), all or a portion of the Internet, or any other communication system or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain this disclosure. Other changes, substitutions, and alterations are also possible without departing from the spirit and scope of this disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
   simulating, using an application programming interface (API), a deployment of database files, the simulating comprising:
      generating a dependency graph for the database files, wherein the dependency graph comprises at least a first node corresponding to a first virtual file and a second node corresponding to a second real file, the first node is indicated as generated from the second node, and wherein the first virtual file and the second real file are associated with multiple database synonym definitions;
      selecting an unvisited node of the dependency graph;
      performing a breadth-first-search (BFS) starting from the selected unvisited node, wherein the selected unvisited node is selected arbitrarily and the BFS traverses nodes of the dependency graph in both incoming and outgoing directions of dependency graph edges;
      defining results of the BFS as a group; and
      returning a group assignment for the database files.

2. The computer-implemented method of claim 1, wherein each node of the dependency graph is assigned a unique ID from 0 to n−1, where n is the node count in the dependency graph.

3. The computer-implemented method of claim 1, further comprising marking entries in a Boolean array to indicate visited nodes in the dependency graph.

4. The computer-implemented method of claim 1, wherein a group is a set of file uniform resource identifiers.

5. The computer-implemented method of claim 1, further comprising:
   selecting another unvisited node of the dependency graph if unvisited nodes exist in the dependency graph; and
   filtering files for deployment if no unvisited nodes exist in the dependency graph.

6. The computer-implemented method of claim 1, further comprising initiating deployment of database files based upon group information.

7. A non-transitory, computer-readable medium storing one or more instructions executable by a computer system to perform operations comprising:
   simulating, using an application programming interface (API), a deployment of database files, the simulating comprising:
      generating a dependency graph for the database files, wherein the dependency graph comprises at least a first node corresponding to a first virtual file and a second node corresponding to a second real file, the first node is indicated as generated from the second node, and wherein the first virtual file and the second real file are associated with multiple database synonym definitions;
      selecting an unvisited node of the dependency graph;
      performing a breadth-first-search (BFS) starting from the selected unvisited node, wherein the selected unvisited node is selected arbitrarily and the BFS traverses nodes of the dependency graph in both incoming and outgoing directions of dependency graph edges;
      defining results of the BFS as a group; and
      returning a group assignment for the database files.

8. The non-transitory, computer-readable medium of claim 7, wherein each node of the dependency graph is assigned a unique ID from 0 to n−1, where n is the node count in the dependency graph.

9. The non-transitory, computer-readable medium of claim 7, further comprising one or more instructions to mark entries in a Boolean array to indicate visited nodes in the dependency graph.

10. The non-transitory, computer-readable medium of claim 7, wherein a group is a set of file uniform resource identifiers.

11. The non-transitory, computer-readable medium of claim 7, further comprising one or more instructions to:
   select another unvisited node of the dependency graph if unvisited nodes exist in the dependency graph; and
   filter files for deployment if no unvisited nodes exist in the dependency graph.

12. The non-transitory, computer-readable medium of claim 7, further comprising one or more instructions to initiate deployment of database files based upon group information.

13. A computer-implemented system, comprising:
   a computer memory; and
   a hardware processor interoperably coupled with the computer memory and configured to perform operations comprising:
      simulating, using an application programming interface (API), a deployment of database files, the simulating comprising:
         generating a dependency graph for the database files, wherein the dependency graph comprises at least a first node corresponding to a first virtual file and a second node corresponding to a second real file, the first node is indicated as generated from the second node, and wherein the first virtual file and the second real file are associated with multiple database synonym definitions;
         selecting an unvisited node of the dependency graph;
         performing a breadth-first-search (BFS) starting from the selected unvisited node, wherein the selected unvisited node is selected arbitrarily and the BFS traverses nodes of the dependency graph in both incoming and outgoing directions of dependency graph edges;
         defining results of the BFS as a group; and
         returning a group assignment for the database files.

14. The computer-implemented system of claim 13, wherein:

entries are marked in a Boolean array to indicate visited nodes in the dependency graph.

15. The computer-implemented system of claim 13, wherein each node of the dependency graph is assigned a unique ID from 0 to n−1, where n is the node count in the dependency graph.

16. The computer-implemented system of claim 13, wherein a group is a set of file uniform resource identifiers.

17. The computer-implemented system of claim 13, further configured to:

select another unvisited node of the dependency graph if unvisited nodes exist in the dependency graph; and filter files for deployment if no unvisited nodes exist in the dependency graph.

18. The computer-implemented system of claim 13, further configured to initiate deployment of database files based upon group information.

\* \* \* \* \*